United States Patent [19]

Bovier et al.

[11] 4,231,803

[45] Nov. 4, 1980

[54] STARCH ADHESIVE COMPOSITION CONTAINING AN OXIDIZED WAXY STARCH ESTER

[75] Inventors: Edward M. Bovier, St. Louis County; James A. Carter, St. Louis, both of Mo.

[73] Assignee: Anheuser-Busch Incorporated, St. Louis, Mo.

[21] Appl. No.: 908,222

[22] Filed: May 22, 1978

[51] Int. Cl.³ .............................................. C08L 3/06
[52] U.S. Cl. ..................................... 106/213; 428/533
[58] Field of Search ............................... 106/210–213; 536/105, 110; 428/533

[56] References Cited

U.S. PATENT DOCUMENTS

| | | | |
|---|---|---|---|
| 2,354,838 | 8/1944 | Schopmeyer et al. | 536/105 |
| 2,461,139 | 2/1949 | Caldwell | 536/110 |
| 3,351,480 | 11/1967 | Mentzer | 106/210 |
| 3,408,214 | 10/1968 | Mentzer | 106/213 |
| 3,732,207 | 5/1973 | Kovats | 106/213 |

*Primary Examiner*—Theodore Morru
*Attorney, Agent, or Firm*—Gravely, Lieder & Woodruff

[57] ABSTRACT

A gummed adhesive formulation is disclosed which contains as its major component a depolymerized waxy starch ester, preferably an oxidized waxy starch acetate or succinate. Quick tack properties imparted to tape by this formulation are superior to those resulting from an adhesive made from a thin boiling waxy starch and are comparable to those of animal glue at 11 lb/ream remoistening level.

15 Claims, No Drawings

STARCH ADHESIVE COMPOSITION CONTAINING AN OXIDIZED WAXY STARCH ESTER

BACKGROUND OF THE INVENTION

The requirements for gummed tape, and especially reinforced gummed tape, are very severe. It must absorb water evenly and develop even tack, or else the tape will stick only in spots. It must, when remoistened, have a certain amount of "slip" to enable the user to adjust it slightly if it has not been placed in the correct position. Its initial tack must be fast, but the open time of the adhesive must be such that its tack is not lost if the operator is slow in using the moistened tape. It must not curl, and it must form a good bond with the surface to which it is applied.

Animal glue is an ideal adhesive for gummed tape. However, it is undesirable for many purposes because of its relatively high cost and the difficulty of obtaining supplies of consistent quality.

It is an object of this invention to provide a starch based adhesive that possesses tack properties similar to those of animal glue.

The combination of urea with certain oxidized waxy starch esters results in an adhesive suitable for gummed tape which will exhibit tack properties equivalent to those of animal glue.

The starch based adhesives used for gummed tape are prepared by heating the starch derivative with water and other additives (plasticizers, humectants, etc.) to a temperature between 85° and 95° C. for 15 to 30 minutes. The adhesive is then cooled to about 60° to 70° C. and applied to the tape by means of a roll coater or other application device. Thereafter, the tape is dried, rewound, and cut.

SUMMARY OF THE INVENTION

This invention involves an adhesive formulation suitable for gummed tape. The major component is an oxidized waxy starch ester, preferably an acetate or succinate. The adhesive mixture comprises oxidized waxy starch ester, water, and a plasticizer, preferably urea. The quick tack properties of gummed tape formed by this adhesive formulation are comparable to those of animal glue, and superior to those of adhesives derived from thin boiling starch.

DETAILED DESCRIPTION

The starting material is a slurry consisting of about 35 to 40 parts of unmodified waxy starch and about 60 to 65 parts of water. Suitable starches which can be employed include waxy maize, waxy milo, and other waxy varieties. A waxy starch is one consisting of essentially all amylopectin. The preferred starch is a waxy maize starch.

While the temperature of the starch slurry is maintained at 25° C., the pH of the slurry is adjusted to 9.0 by slowly adding a 2% aqueous solution of sodium hydroxide.

The starch in the alkaline slurry is depolymerized, and preferably is degraded by oxidization. Carbonyl and carboxyl groups are formed by elimination of hydrogen atoms from the alcoholic and the carbonyl end groups, respectively. The introduction of carbonyl groups ultimately leads to the cleavage of the glucosidic linkages and degradation of the starch. The preferred method of oxidation is to add about 0.03 to 0.05 parts of available chlorine per part of starch by means of an alkaline sodium hypochlorite solution containing about 6.0 to 8.0% available chlorine and about 2.8 to 3.2% sodium hydroxide. The sodium hypochlorite is added at such a rate that the pH of the slurry does not exceed 11. The sodium hypochlorite addition requires a period of about 3 to 8 hours. The thus treated starch should have an alkaline fluidity ranging from about 86 to about 93 ml measured at 25° C. as described in "Chemistry and Industry of Starch", 2nd edition, R. W. Kerr, Academic Press, Inc., New York, N. Y. (1950), p. 133.

After the hypochlorite addition has been completed, the slurry is stirred for about 1 to 2 hours. At this point, the Brabender viscosity is 40–60 measured in Brabender Units (B. U.) at 35% solids, 700 cm-g. head, 75 rpm, 20 minutes at 92.5° C. The unreacted available chlorine is then removed by addition of about 0.3% sodium bisulfite ($NaHSO_3$), based on the weight of the starch.

An esterifying agent is then added to the slurry. The preferred agent is acetic anhydride. Other suitable esterifying agents are succinic anhydride, n-octenyl succinic anhydride, and phthalic anhydride. About 3% to 12% anyhdride, based on the weight of the starch, is added to the slurry. At the same time, an alkaline solution of sodium hydroxide and sodium carbonate is slowly added to the slurry in order to maintain the pH between 7.0 and 9.0. After esterification, the slurry is neutralized, washed, fitlered and dried. The resulting starch ester will have a substitution of about 1.5% to about 2% ester groups, an alkaline fluidity of about 86 to about 93 ml and a carboxyl value of about 0.3 to about 0.5%.

To produce the adhesive formulation, from about 40 to about 45 parts of the starch derivative, preferably oxidized waxy starch acetate, and from about 2 to about 6 parts of a plasticizer and from about 58 to about 49 parts of water are mixed together.

The concentration of starch ester in the adhesive formulation should range from about 40% to about 45% by weight of the total adhesive formulation. If the concentration of starch ester is too high, the adhesive formulation cannot be prepared due to mechanical difficulties, such as high viscosity and insufficient water to suspend the starch. If the concentration of starch ester is too low, the quick tack and adhesive properties will decline, thus resulting in a product unsuitable for commercial use.

Suitable plasticizers include urea, sodium nitrate, sodium nitrite, sorbitol, glycerin, propylene glycol and corn syrup. Urea is preferred because it not only functions to plasticize the adhesive, but it also aids in absorbing water into the overall adhesive composition. The concentration of urea should range from about 2% to about 6% by weight of the total adhesive formulation. If the concentration of urea is too high, quick tack and adhesive properties will be unsuitable. If the concentration of urea is too low, the adhesvie formulation will cause the tape to curl due to film shrinkage. Moreover, the tape will also exhibit less flexibility.

This mixture is heated with agitation to 85°–95° C. and maintained at that temperature for about 20 minutes. Heating with agitation will gelatinize the starch, resulting in a high degree of dispersion. Thoroughness of dispersion is required to impart desirable quick tack properties. The mixture is then cooled to 60°–70° C.

EXAMPLE I 2000 g of unmodified waxy maize starch were added to 2800 ml of water. The mixture was heated to between 75° and 80° F. The pH was adjusted to 9.0 by adding a 2% aqueous solution of sodium hydroxide. About 60 ml of this solution were required. 740 ml of sodium hypochlorite, containing 57.6 g available chlorine, were added to the mixture over a period of about 3 hours. The pH of the mixture was prevented from exceeding 11.0 by controlling the rate of sodium hypochlorite. After the sodium hypochlorite was added, the mixture was stirred for 3 hours. 3.35 g of sodium bisulfite were added to the mixture to remove unreacted available chlorine. 84 g of acetic anhydride were added to the oxidized waxy starch. This amounted to 8% of the weight of the starch. The pH of the mixture was maintained at 7.5 to 8.5 with a mixed solution of 7% aqueous sodium hydroxide and 15% aqueous sodium carbonate. After the addition of acetic anhydride, the mixture was stirred for 20 minutes. Two volumes of water were then added to wash out excess salts. The pH was finally adjusted to 5.2 with hydrochloric acid. The oxidized waxy starch acetate was then filtered and dried.

To make the adhesive composition, 180 g of the oxidized waxy starch acetate (dry solids), 20 g of urea, and 200 g of water were placed in a covered container and thoroughly mixed. The mixture was heated with agitation to 95° C. and held at this temperature for 20 minutes. The mixture was then cooled to 60° C. At this point, the adhesive was suitable for use in gummed tape.

EXAMPLE II 58 g of succinic anhydride were added to an oxidized waxy starch which had been prepared in the same manner as the oxidized starch derivative of Example I. The pH of the mixture was maintained at 7.5 with a solution of 7% aqueous sodium hydroxide and 15% aqueous sodium carbonate. After the addition of succinic anhydride, the mixture was stirred for 20 minutes. Two volumes of water were then added to wash out excess salts. The pH was finally adjusted to 5.3 with hydrochloric acid. The oxidized waxy starch succinate was then filtered and dried.

To make the adhesive composition, 180 g of the oxidized waxy starch succinate (dry solids), 20 g of urea, and 200 g of water were placed in a covered container and thoroughly mixed. The mixture was heated with agitation to 95° C. and held at this temperature for 20 minutes. The mixture was then cooled to 60° C. At this point, the adhesive was suitable for use in gummed tape.

TESTING PROCEDURE[1]

A 1½"×20" strip of standard test paper is coated upon the inside curl of the roll of paper, using a wire wound rod. The standard test paper is 60# Golden Brown Nibroc Kraft Gumming Paper which meets the following requirements:

This is paper made from spruce pulp - sulfate process. It is rosin beater sized and starch surface sized. (Four- drinier sheet; machine finish.)
Paper Characteristics: 50±2% Relative Humidity and 73°±3.5° F.

| Test | High | Low | Avge. |
|---|---|---|---|
| Basis Wt. (lbs.) (24" × 36" × 500) | 63.0 | 57.0 | 60.0 |
| Thickness (.001") | 5.3 | 4.8 | 5.0 |
| Bursting Strength (Points - Mullen) | * | 54 | 57 |
| Tear Resistance MD (Elmendorf - CMD Grams/Sheet) | * | 113 | 120 |
|  | * | 134 | 140 |
| Degree of Sizing (Sec. - Carson) | * | 20 | 25.0 |
| Air Resistance (Sec. per 100 ml Gurley Densometer) | * | 50 | 70 |
| Tensile (Dry) MD (#/In. Width) CMD | * | 45 | 50 |
|  | * | 22 | 24 |
| Moisture (%) (Unconditioned) | 7.0 |  |  |
| Degree Curl | 35 | 28 | 31 |

*For these tests, no upper limit was specified.

[1] As described in G[f]A 203 TM-67, "The Adhesiveness of Gummed Paper Tape" (Werle Test), December 1, 1967, supplied by the Gummed Industries Association, Inc.

| Test | High | Low | Avge. |
|---|---|---|---|
| Basis Wt. (lbs.) (24" × 36" × 500) | 63.0 | 57.0 | 60.0 |
| Thickness (.001") | 5.3 | 4.8 | 5.0 |
| Bursting Strength (Points - Mullen) | * | 54 | 57 |
| Tear Resistance MD (Elmendorf - CMD Grams/Sheet) | * | 113 | 120 |
|  | * | 134 | 140 |
| Degree of Sizing (Sec. - Carson) | * | 20 | 25.0 |
| Air Resistance (Sec. per 100 ml Gurley Densometer) | * | 50 | 70 |
| Tensile (Dry) MD (#/In. Width) CMD | * | 45 | 50 |
|  | * | 22 | 24 |
| Moisture (%) (Unconditioned) | 7.0 |  |  |
| Degree Curl | 35 | 28 | 31 |

*For these tests, no upper limit was specified.

The sample is trimmed to 1½" by 18" and net coating weight determined. (16 to 18 lb/ream is the desired coating range for regular gummed tape). The sample is then positioned on the Werle Tack Tester. The Werle Tack Tester is a machine designed to determine the rate of development of cohesiveness in fluid adhesive films between two substrates. It consists essentially of two sets of jaws, one of which is moved at a fixed rate and the other of which is attached to a graphic recording mechanism, a flat plate upon which the test sample rests, a No. 14 Meyer Rod for spreading a uniform volume of remoistening water (an amount equivalent to 11 lb per ream remoistening water), and a laminating roller. Measurement is made of the resistance to 180° peel (nominal) of the test sample after being laminated to a standard test paper.

After the test sample is positioned, a 1"×20" strip of the standard test paper is positioned, with the inside curl facing the test sample. The Meyer Rod and laminating roll are then positioned and 1½ ml distilled water is pipetted immediately in front of the Meyer Rod.

Quick tack detrminations are obtained by noting the times required for the peeling force to permanently equal or exceed 20 g, 100 g, and 200 g. The 100 g reading is the point at which significant fiber tear occurs. The 20 g reading, along with any initial jump, indicates the first significant adhesion. The 200 g reading indicates final tack strength. In comparing two adhesives, the one exhibiting a lower time is the one having superior quick tack characteristics.

The following table shows the Werle testing results obtained on gummed tapes made with animal glue, the formulation of Example I, the formulation of Example I type with a higher acetyl content, the formulation of Example II, and a thin boiling waxy starch.

TABLE I

| Adhesive | Time in Seconds for Peeling Force to Exceed Specified Level, 11 lb/ream Remoistening Water (16-18 lb/ream Coating Range) | | |
|---|---|---|---|
| | 20 g | 100 g | 200 g |
| High Grade Hide Animal Glue | 2.7 | 3.3 | 9.5 |
| Oxidized Waxy Starch Acetate 1.6% Acetyl Substitution | 2.7 | 3.0 | 7.2 |
| Oxidized Waxy Starch Acetate 2.0% Acetyl Substitution | 2.4 | 3.1 | 6.9 |
| Oxidized Waxy Starch Succinate 1.5% Succinyl Substitution | 2.7 | 3.5 | 9.2 |
| Thin Boiling Waxy Starch | 3.5 | 4.6 | 10.7 |

From the foregoing table, it can be seen that quick tack properties imparted to tape by an oxidized waxy starch ester formulation are superior to those resulting from an adhesive made from a thin boiling waxy starch, and are comparable to those of animal glue.

What is claimed is:

1. A composition suitable for use as a remoistening adhesive for gummed tape comprising an esterified oxidized waxy starch ester, a plasticizer, and water, said waxy starch ester having an acyl substitution of about 1.5% to about 2% and about 0.3% to about 0.5% carboxyl groups, said composition when applied to tape, dried, and remoistened having tack properties similar to those of an adhesive made from animal glue.

2. The composition of claim 1 wherein the plasticizer is selected from the group consisting of urea, sodium nitrate, sodium nitrite, sorbitol, glycerin, propylene glycol and corn syrup.

3. The composition of claim 1 wherein the starch ester is an oxidized waxy starch acetate.

4. The composition of claim 1 wherein the starch ester is an oxidized waxy starch succinate.

5. The composition of claim 1 wherein about 40 to about 45 parts of oxidized waxy starch ester, about 2 to about 6 parts of plasticizer, and about 58 to about 49 parts of water are used.

6. A method of preparing gummed tape having a remoistening adhesive adhered thereto comprising the steps of
   (a) forming an adhesive composition comprising about 40 to about 45% gelatinized oxidized waxy starch ester, said oxidized waxy starch ester having an acyl substitution of about 1.5% to about 2% and about 0.3% to about 0.5% carboxyl groups, about 49 to about 58% water and about 2 to about 6% plasticizer,
   (b) applying said adhesive composition to a tape strip, and
   (c) drying said coated tape, said adhesive when remoistened having tack properties similar to those of an adhesive made from animal glue.

7. The method of claim 6 wherein the oxidized waxy starch ester is an oxidized waxy starch acetate.

8. The method of claim 7 wherein the oxidized waxy starch acetate is prepared by oxidizing waxy starch with sodium hypochlorite, then acetylating said oxidized waxy starch with acetic anhydride.

9. The method of claim 8 wherein 0.03 to 0.05 parts of available chlorine as sodium hypochlorite are used per part of starch, and 0.8 to 0.12 parts of acetic anhydride are used per part of oxidized waxy starch.

10. The method of claim 6 wherein the oxidized waxy starch ester is an oxidized waxy starch succinate.

11. The method of claim 10 wherein the oxidized waxy starch succinate is prepared by oxidizing waxy starch with sodium hypochlorite, then succinating said oxidized waxy starch with succinic anhydride.

12. The method of claim 11 wherein 0.03 to 0.05 parts of available chlorine as sodium hypochlorite are used per part of starch, and 0.03 to 0.04 parts of succinic anhydride are used per part of oxidized waxy starch.

13. The method of claim 6 wherein the plasticizer is selected from the group consisting of urea, sodium nitrate, sodium nitrite, sorbitol, glycerin, propylene glycol, and corn syrup.

14. The method of claim 6 wherein the mixture is heated to about 85° to 95° C.

15. The method of claim 6 wherein the heated mixture is cooled to about 60° to 70° C.

* * * * *